(12) United States Patent
Genuise

(10) Patent No.: US 11,687,749 B2
(45) Date of Patent: Jun. 27, 2023

(54) CODE READER AND RELATED METHOD FOR OBJECT DETECTION BASED ON IMAGE AREA PERCENTAGE THRESHOLD

(71) Applicant: Datalogic IP Tech S.R.L., Calderara di Reno (IT)

(72) Inventor: Andrea Genuise, Bologna (IT)

(73) Assignee: Datalogic IP Tech S.R.L., Calderara di Reno (IT)

(*) Notice: Subject to any disclaimer, the term of this patent is extended or adjusted under 35 U.S.C. 154(b) by 19 days.

(21) Appl. No.: 17/466,777

(22) Filed: Sep. 3, 2021

(65) Prior Publication Data
US 2022/0075973 A1 Mar. 10, 2022

Related U.S. Application Data

(60) Provisional application No. 63/075,062, filed on Sep. 4, 2020.

(51) Int. Cl.
*G06K 7/14* (2006.01)
*G06K 7/10* (2006.01)

(52) U.S. Cl.
CPC ....... *G06K 7/1413* (2013.01); *G06K 7/10722* (2013.01); *G06K 7/10881* (2013.01); *G06K 2007/10524* (2013.01)

(58) Field of Classification Search
CPC ........... G06K 7/10722; G06K 7/10861; G06K 7/109; G06K 7/1404; G06K 7/1413

USPC .................................................. 235/461.41
See application file for complete search history.

(56) References Cited

U.S. PATENT DOCUMENTS

| | | | |
|---|---|---|---|
| 8,267,316 B2 | 9/2012 | Ostrowski et al. | |
| 9,004,359 B2 | 4/2015 | Shearin et al. | |
| 9,087,251 B2 * | 7/2015 | Tamburrini | G06K 7/109 |
| 9,515,512 B2 | 12/2016 | O'Donnell et al. | |
| 9,798,948 B2 | 10/2017 | Deppieri et al. | |
| 10,025,966 B1 | 7/2018 | Volta et al. | |
| 10,176,351 B2 | 1/2019 | Volta et al. | |
| 10,496,858 B2 | 12/2019 | Volta et al. | |
| 2005/0013486 A1 * | 1/2005 | Wiedemann | G06V 20/13 |
| | | | 382/181 |
| 2012/0181338 A1 * | 7/2012 | Gao | G06K 7/12 |
| | | | 235/455 |
| 2014/0097337 A1 | 4/2014 | Handshaw et al. | |
| 2018/0196979 A1 | 7/2018 | Liu et al. | |
| 2019/0205583 A1 | 7/2019 | Bruni et al. | |
| 2020/0106279 A1 | 4/2020 | Di Bari et al. | |

* cited by examiner

*Primary Examiner* — Toan C Ly
(74) *Attorney, Agent, or Firm* — Foley & Lardner LLP

(57) ABSTRACT

A code reader includes an imager configured to capture an image, and a processor operably coupled to the imager. The processor performs an object detection operation having a configurable triggering threshold that may be set, at least in part, based on an amount of changes needed to be detected in order to trigger a positive result for object detection. The processor also initiates a scanning phase for the code reader to read and decode an indicia responsive to the positive result being achieved by the object detection operation.

20 Claims, 7 Drawing Sheets

CODE READER AND RELATED METHOD FOR OBJECT DETECTION BASED ON IMAGE AREA PERCENTAGE THRESHOLD

PRIOR APPLICATION

This Application claims the benefit of U.S. Provisional Application No. 63/075,062, filed Sep. 4, 2020, and entitled CODE READER AND RELATED METHOD FOR OBJECT DETECTION BASED ON IMAGE AREA PERCENTAGE THRESHOLD, the disclosure of which is incorporated by reference herein in its entirety.

TECHNICAL FIELD

The present disclosure relates generally to code readers, and more particularly, to coder readers operable in a presentation mode with a scanning phase that is activated by an object detection operation.

BACKGROUND

Code readers, such as handheld scanning devices, are well known and used in a wide range of enterprise applications. For example, barcode scanners are regularly used in connection with checkout stations at supermarkets and other retail establishments for reading barcodes on consumer goods. Code readers are also useful in inventory collection and control for warehousing, shipping and storage of products, and other related applications. The conditions under which such code readers are used can vary greatly from location to location, and industry to industry. One typical usage of code readers is called "handheld mode" in which the user holds the code reader and presses a trigger button to initiate the scanning phase of the code reader for image capture and decoding. Another typical usage is called "presentation mode" (also known as "hands-free"). In this mode, barcodes are typically presented in front of the code reader, which detects the object and automatically triggers the scanning phase. The inventor has appreciated improvements to such object detection and triggering of the scanning phase.

BRIEF SUMMARY

A code reader comprises an imager configured to capture an image, and a processor operably coupled to the imager. The processor is configured to perform an object detection operation having a configurable threshold that may be set, at least in part, based on an amount of changes needed to be detected in order to trigger a positive result for object detection; and initiate a scanning phase for the code reader to read and decode an indicia responsive to the positive result being achieved by the object detection operation.

A method for operating a code reader comprises capturing an image with an imager, performing an object detection operation having a configurable triggering threshold that is indicative of an amount of changes needed to be detected within the image in order to trigger a positive result for object detection, and initiating a scanning phase for the code reader to read and decode an indicia responsive to the positive result being achieved by the object detection operation.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

One or more implementations of the present disclosure are directed to handheld optical code (e.g., barcode) readers (also referred to as "scanners"). In general, such a scanner may include a scanning head that comprises an optical sensor (e.g., imager) to capture an indicia that encodes data and a processor to interpret the indicia to decode the data, and an elongate handle connected at a first end to the scanning head and graspable to orient the optical sensor toward the indicia or object. Illumination sources (e.g., red, white) may also be included to assist with image capture. The optical sensor may be a monochrome imager or a color imager depending on the particular application or desired capabilities of the scanner. The device may be configured to read and decode optical codes, such as 1D and 2D codes as well as high density codes, Dot codes, watermarking (e.g., Digimarc), optical character recognition (OCR), and other visual code and image recognition techniques for identifying an object. In some embodiments, the scanner may include communication modules configured to communication with Bluetooth wireless technology and/or narrow band radio communications with Datalogic's STAR Cordless System, or other communication technologies and protocols.

Figure 1:
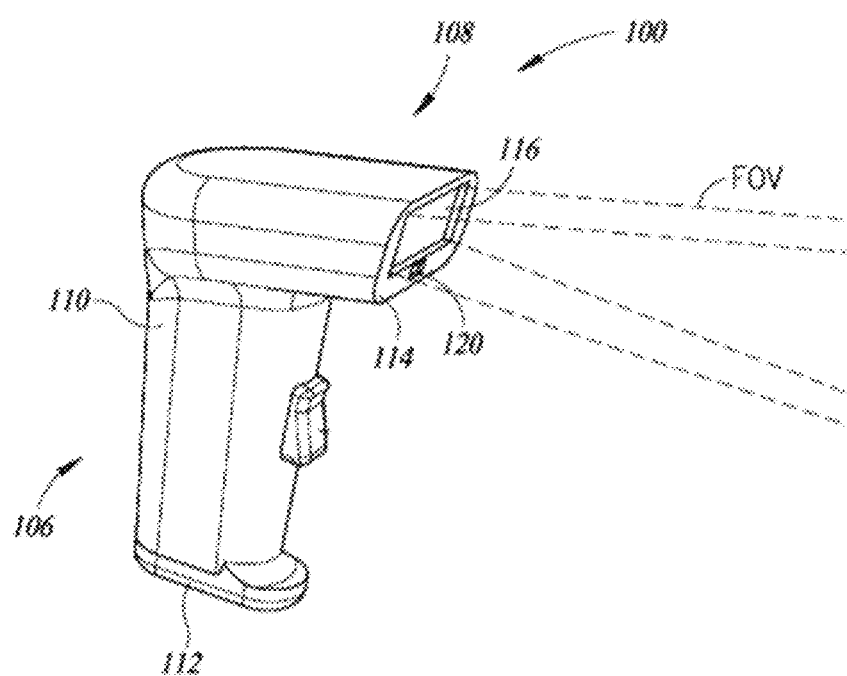
FIG. 1 is a code reader according to an embodiment of the disclosure.

FIG. 1 is a code reader 100 according to an embodiment of the disclosure. The code reader may operate by acting upon a target object having an optical code disposed thereon. The code reader 100 may be an imaging-based machine-readable symbol reader. The code reader 100 may include a gripping portion 106 and a scanning head portion 108 extending from an upper portion 110 of the gripping portion 106. The gripping portion 106 may be shaped and sized to be grasped by the user's hand. A lower portion 112 of the gripping portion 106 may be shaped and sized to be received in a docking station (not shown), or the code reader 106 may be configured to be received by the docking station in other ways. The machine-readable symbol reader 100 includes a front wall region 114 on the scanning head portion 108. The scanning head portion 108 also includes a transparent window 116 present on the front wall 114 behind which is positioned an image formation subsystem.

The code reader 100 may be used in at least one of a handheld mode or a fixed position mode (i.e., presentation mode). In the fixed position mode, the reader 100 may be received in a docking station and the target object 102 may be brought within the angular field-of-view (FOV) of the machine-readable symbol reader to have the reader 100 read the optical code. In the handheld mode, the reader 100 may be carried by an operator and positioned such that the surface of the target object is within the field-of-view (FOV)

of the code reader 100. In the handheld mode, imaging and decoding of the target characters 104 may be initiated by the operator depressing a trigger 118.

In some embodiments, the code reader 100 may also include an optional aiming subsystem 120, for example, positioned on the front wall 114 of the scanning head portion 108 of the reader. The aiming subsystem 120 may also be positioned behind the window 116 adjacent the image formation subsystem. The aiming subsystem 120 may project an aiming pattern (not shown for clarity) which allows the operator to aim the machine-readable symbol reader 100 toward the characters 104 provided on the surface of the target object 102.

Figure 2:
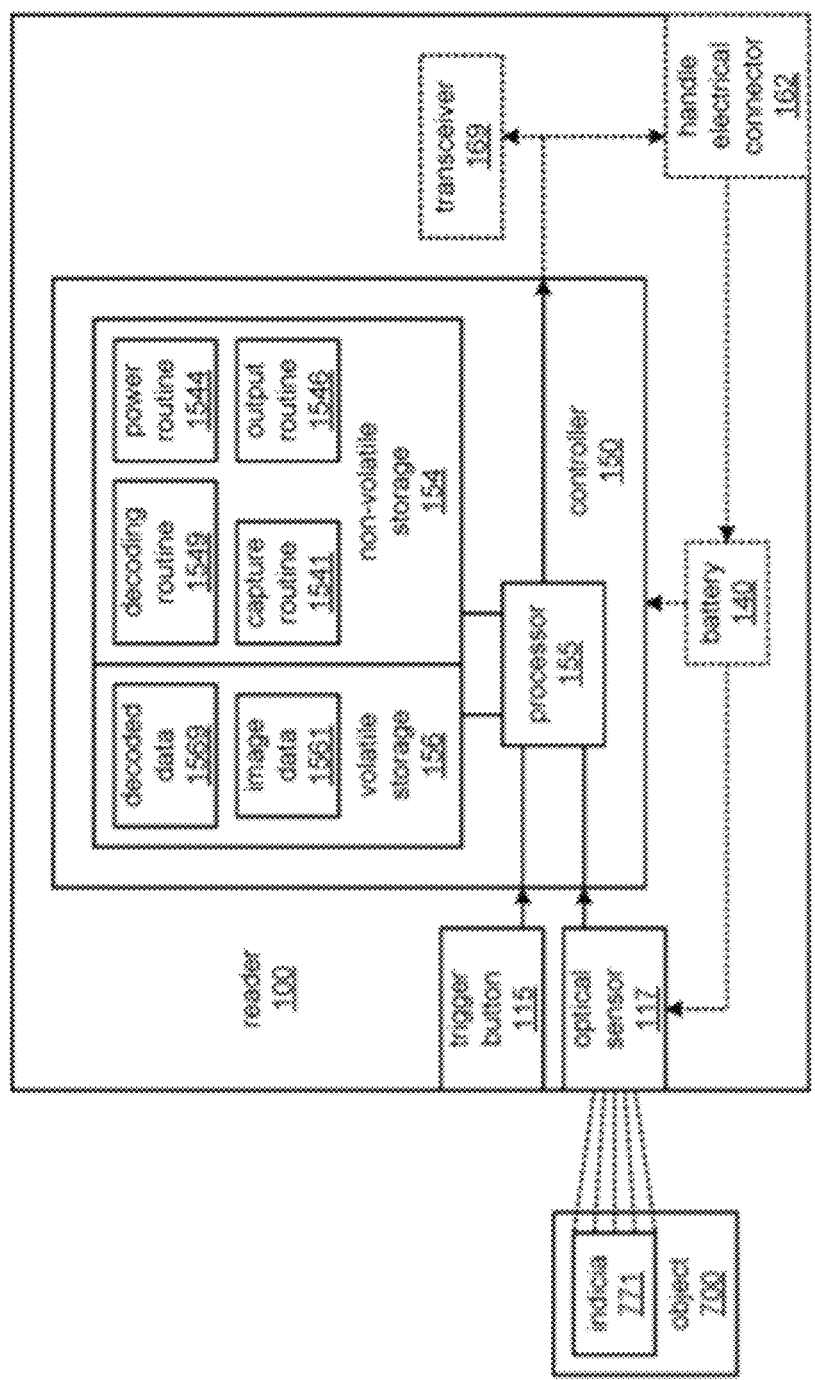
FIG. 2 depicts aspects of an example embodiment of an internal architecture of the code reader of FIG. 1.

FIG. 2 depicts aspects of an example embodiment of an internal architecture of the code reader 100 of FIG. 1. More specifically, FIG. 2 provides a block diagram of an embodiment of an internal architecture of the code reader 100, showing elements that may be involved in the decoding and transmitting of data (e.g., to a POS system, remote server, etc.).

The code reader 100 may include one or more of a trigger button 115, an optical sensor 117, a battery 140, a handle electrical connector 162, and a transceiver 169. As depicted, the controller 150 may be coupled to the trigger button 115, the optical sensor 117, the battery 140, the handle electrical connector 162 and/or the transceiver 169. The controller 150 may incorporate one or more of a processor 155, volatile storage 156 and non-volatile storage 154. As depicted, the volatile storage may store one or both of image data 1561 and decoded data 1569, and the non-volatile storage may store one or more of a capture routine 1541, a power routine 1544, an output routine 1546, and a decoding routine 1549.

The volatile storage 156 may be based on any of a variety of storage technologies that provide relatively high speeds of access, but which require the continuous provision of electric power to retain any data and/or routines stored therein. Such technologies may include, and are not limited to, random-access memory (RAM), dynamic RAM (DRAM), Double-Data-Rate DRAM (DDR-DRAM), synchronous DRAM (SDRAM), static RAM (SRAM), etc. The non-volatile storage 154 may be based on any of a variety of storage technologies that may not be capable of providing such relatively high speeds of access, but which may be capable of storing with greater density, and capable of retaining data and/or routines stored therein regardless of whether electric power is continuously provided. Such technologies include, and are not limited to, read-only memory (ROM), erasable programmable ROM (EPROM), electrically erasable programmable ROM (EEPROM), flash memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array).

The processor 155 may include any of a wide variety of processors, microcontrollers, gate-array logic devices, etc. that may be incorporate any of a variety of features to enhance speed and/or efficiency of processing operations. Such features may include and are not limited to, multi-threading support, multiple processing cores, single-instruction multiple-data (SIMD) support, directly integrated memory control functionality, and/or various modes of operation by which speed of throughput and/or level of power consumption may be dynamically altered.

The transceiver 169 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, the transceiver 169 may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

The handle electrical connector 162 may include electrical contacts by which electric power and/or data transfer signals may be exchanged therethrough and with a mating connector to which the handle electrical connector 162 may be coupled. Additionally, the handle electrical connector 162 may have a physical configuration and/or may be configured to support an exchange of electric power and/or data transmission signals that adhere to one or more known and widely used standards, including and not limited to RS-232C, RS-422, Universal Serial Bus (USB), Ethernet (IEEE-802.3) or IEEE-1394

The battery 140 may be coupled to and provide electric power for the operation of the optical sensor 117, the controller 150 and/or the transceiver 169. The battery 140 may be based on any of a wide variety of energy storage technologies to provide energy storage that enables recharging, including and not limited to, nickel-cadmium (NiCd), nickel-metal hydride (NiMH), lithium-ion and/or lithium-polymer.

The optical sensor 117 may be based on any of a variety of technologies and may employ any of a variety of optical scanning and/or other image capturing techniques to capture indicia 771 carried by a portion of an object 700. More specifically, the optical sensor 117 may include any of a variety of light sensing components to effect the capture of an image of the indicia 771, including and not limited to, a charge-coupled device (CCD) providing a single row of individual light sensors operated in a manner that sweeps over the indicia 771 to scan it, or a CCD providing a two-dimensional (2D) array of individual light sensors to capture a 2D image of the optical sensor 117 in a manner akin to a camera.

In some embodiments, the optical sensor 117 may emit various forms of collimated and/or monochromatic light, including light that projects any of a variety of patterns onto a surface of the object 700 that carries the indicia 771. As those skilled in the art will readily recognize, such emission of light may be to provide sufficient illumination to ensure that the indicia 771 is sufficiently visible to be captured, and/or may be to provide a visible pattern of markers on a surface of the object 700 and/or the indicia 771 as a guide to determining the orientation of indicia 771 relative to the optical sensor 117 to improve the accuracy with which the data encoded within the indicia 771 may be decoded.

The object 700 may be any of a variety of objects that may carry any of a variety of forms of the indicia 771, including and not limited to, a package carrying a shipping label that includes the indicia 771, or a product for sale within retail packaging on which the indicia 771 is printed as part of the graphical artwork thereof. The indicia 771 may encode data, including and not limited to, data indicating the addresses of the sender and intended recipient of a package, or data providing a universal product code (UPC) that uniquely identifies a product for sale.

Thus, the indicia 771 may be any of a variety of forms of bar code or quick-response (QR) code, including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 Data-Bar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; UPC; Aztec Code; Code 1; ColorCode; Color Construct Code; CrontoSign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode.

The processor 155 may access the volatile storage 156 and/or the non-volatile storage 154 to retrieve and/or execute one or more of the routines 1541, 1544, 1546 and 1549 to control various aspects of the operation of the reader 100. In so doing, the processor 155 may be caused to monitor various aspects of the reader 100 and may take various actions in response.

By way of example, the processor 155 may be caused by its execution of the capture routine 1541 to await detection of a trigger signal before initiating the scanning phase. The trigger signal may be generated responsive to manual operation of the trigger button 115 (e.g., when in handheld mode) or responsive to an object detection operation (e.g., when in handsfree mode) that generates the trigger signal automatically based on the processor analyzing activity within the images relative to a configurable triggering threshold described below. As a result, the trigger (e.g., whether manual or by the configurable triggering threshold) may cause the code reader 100 to capture an image of and decode the indicia 771. In response, the processor 155 may be caused to operate the optical sensor 117 to so capture an image of the indicia 711, and store the captured image within the volatile storage 156 as the image data 1561. In addition, the trigger may also initiate the execution of the decoding routine 1549 by the processor 155. In executing the decoding routine 1549, the processor 155 may be caused to employ any of a variety of algorithms to analyze the captured image of the indicia 771 in the image data 1561 to decode the data that may be encoded within the indicia 771. The processor 155 may then be further caused to store that data within the volatile storage 156 as the decoded data 1569. The trigger may also initiate the execution of the output routine 1546 by the processor 155. In various different embodiments, in executing the output routine 1546, the processor 155 may be caused to operate the transceiver 169 to wirelessly transmit the decoded data 1569 to the POS device 900 (and/or to still another device, not shown). Alternatively or additionally, the processor 155 may be caused to transmit the decoded data 1569 to the POS device 900 (and/or to still another device, not shown) through the handle electrical connector 162.

Although FIGS. 1 and 2 show a handheld code reader as an example of a device that may implement various features and methods described herein, different configurations and details regarding the construction and components of a scanner are contemplated, as well as different environments for implementation according to embodiments of the disclosure. For example, additional features and configurations of devices are described in the following patents and patent applications: U.S. Pat. No. 10,496,858, filed Apr. 6, 2018, issued Dec. 3, 2019; U.S. Pat. No. 10,176,351, filed Mar. 28, 2017, issued Jan. 8, 2019; U.S. Pat. No. 10,025,966, filed Apr. 7, 2017, issued Jul. 17, 2018; U.S. Pat. No. 9,798,948, filed Jul. 31, 2015, issued Oct. 24, 2017; U.S. Pat. No. 9,515,512, filed Dec. 15, 2011, issued Dec. 6, 2016; U.S. Pat. No. 9,087,251, filed Aug. 22, 2013, issued Jul. 21, 2015; U.S. Pat. No. 9,004,359, filed May 15, 2013, issued Apr. 14, 2015; U.S. Pat. No. 8,267,316, filed Aug. 22, 2006, issued Sep. 18, 2012; U.S. Pat. App. Pub. 2020/0106279, filed Jun. 5, 2017, published Apr. 2, 2020; U.S. Pat. App. Pub. 2019/0205583, filed Sep. 28, 2018, published Jul. 4, 2019, the disclosure of each of which is incorporated by reference in their entirety.

Embodiments of the disclosure may include handheld scanners that are operable in a handheld scanning mode for use when the device is picked up by a user, or a presentation mode for use when the reader is placed in a holder (e.g., cradle, stand, etc.). The transition between handheld mode and presentation mode may be seamless when the device is either placed in the holder or removed therefrom. The cradle may be configured to be adjustable to provides the flexibility to use the scanner in presentation or stand mode while the scanner is charging (e.g., via charging contact connects or via wireless charging coils). Some embodiments include presentation scanners that may be positioned on a surface (e.g., with a built-in stand) that operates primarily in a presentation mode (e.g., no handheld mode). In some embodiments, the scanner may be a top-down reader associated with a fixed retail scanner in a checkout lane, a bi-optic fixed retail scanner having incorporating cameras within a horizontal and/or a vertical window, or other cameras used for object detection and/or code reading in similar environments.

While in presentation mode, an object detection operation (also referred to as "motion detection") may be performed by the reader to detect an object within the field-of-view and automatically triggers the scanning phase for reading a code or otherwise identifying the object. Thus, the scanning phase may be started by the user presenting an object in front of the reader instead of pressing a manual trigger. Certain benefits of this approach may include one or more of following: 1) Additional hardware (e.g., proximity sensors) may not be needed for object detection. Such implementation in software may provide an alternative way to distinguish near field activity from far field activity without using specific hardware, such as proximity sensors or more expensive imaging sensors. 2) Because the code reader triggers the scanning phase only if a certain portion of the image is changed, false positives may be reduced. 3) Because activity in the far-field is less likely to trigger a detection, the usability of the scanner may also be improved. 4) The configurable triggering threshold may be configurable (in terms of percentage of the image) within the code reader, which may enable the code reader to more easily adapt to different customer scenarios. 5) In some embodiments, the operation may be implemented in hardware for reduced latency. 6) Embodiments of the disclosure may also combine the configurable triggering threshold with other existing object detection strategies (e.g., sensitivity levels already available in handheld reader products).

An issue related to object detection performance is addressed by embodiments of the disclosure. In particular, it may be desirable for the code reader to be quick enough to initiate the scanning phase without causing noticeable latencies to the user, but not too sensitive to other movements in the field-of-view that could wrongly trigger the scanning phase (i.e., false positives). If the code reader is too sensitive, its behavior may be annoying for the user. For example, when false positives occur in the far field of a reader, users can get annoyed by the activation of the illuminators even when a barcode is not put close to the reader window. Retail customers typically desire the reader to not be sensitive to movements in the far field, while remaining sensitive in the near field.

Embodiments of the disclosure provide a configurable triggering threshold for the object detection operation which may reduce false positives of the object detection, particularly for activity detected in the far field. The configurable triggering threshold may be expressed in terms of percentage of the entire imaging area (e.g., within a range of 0-100%). The value is indicative of how much portion of the image should change (at least) in order to trigger a detection. This is in contrast to conventional products that included a fixed with a value that is not configurable and triggers a detection whenever a minimal change is detected in the image compared to a reference image of the background that is previously trained.

Objects carrying barcodes tend to be most often presented by the user in front of the scanner (or very close to it), while other movements unrelated to barcode reading are more likely to be more remote from the scanner even though it may be captured within the field-of-view of the code reader.

Figure 3:
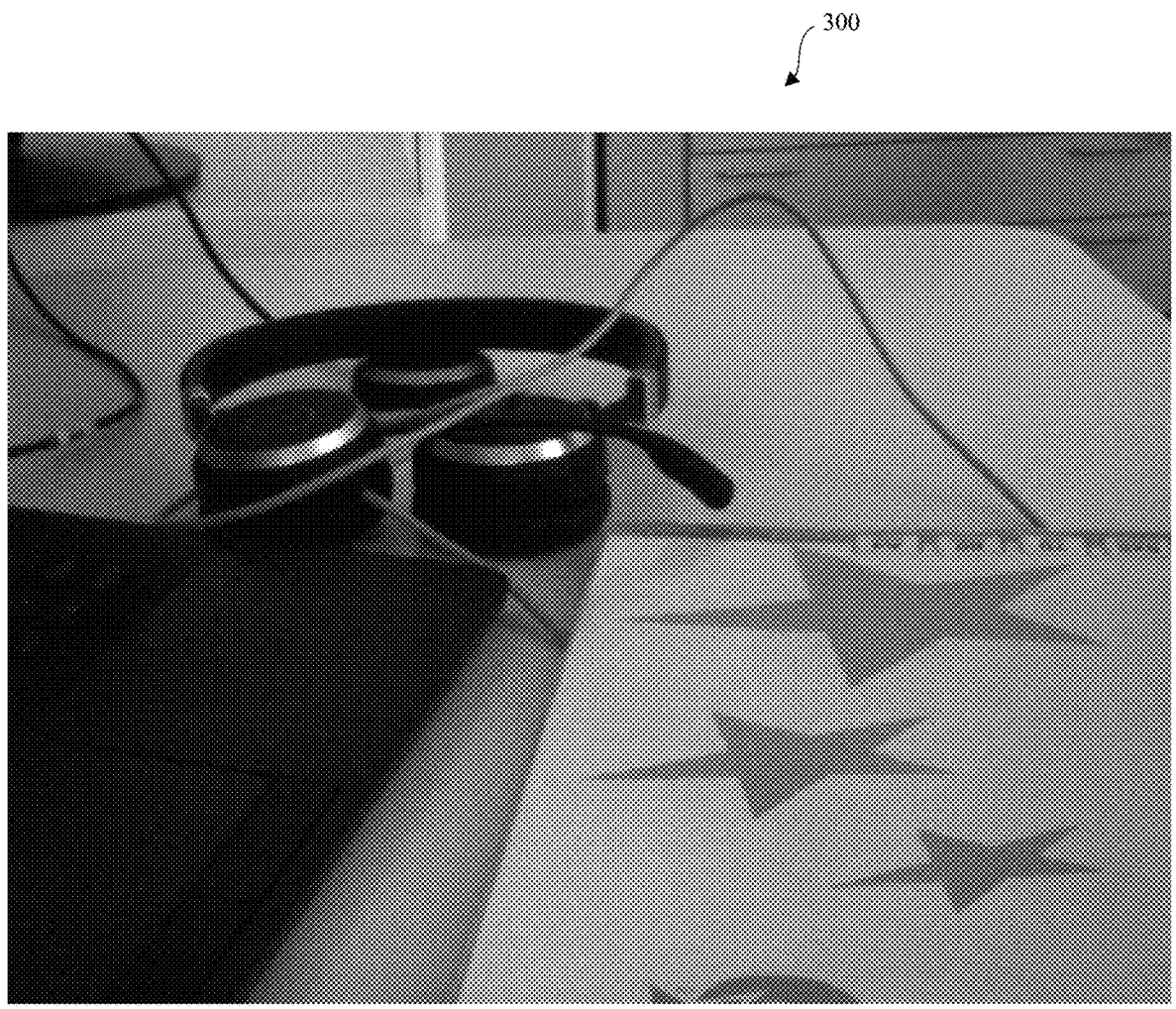
FIG. 3 shows an example of scanner field-of-view without objects.
Figure 4:
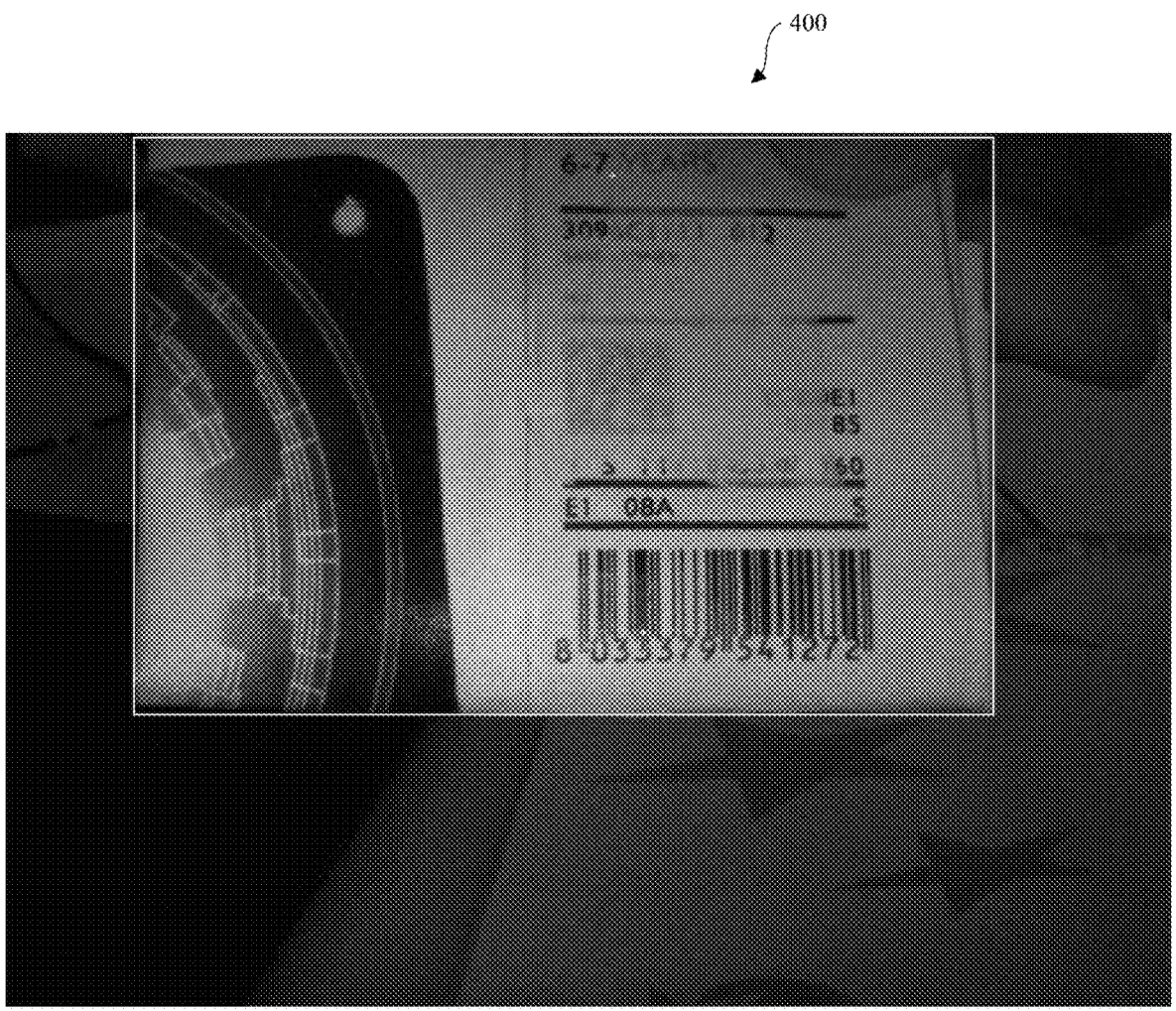
FIG. 4 shows an object in the field-of-view close to the scanner.
Figure 5:
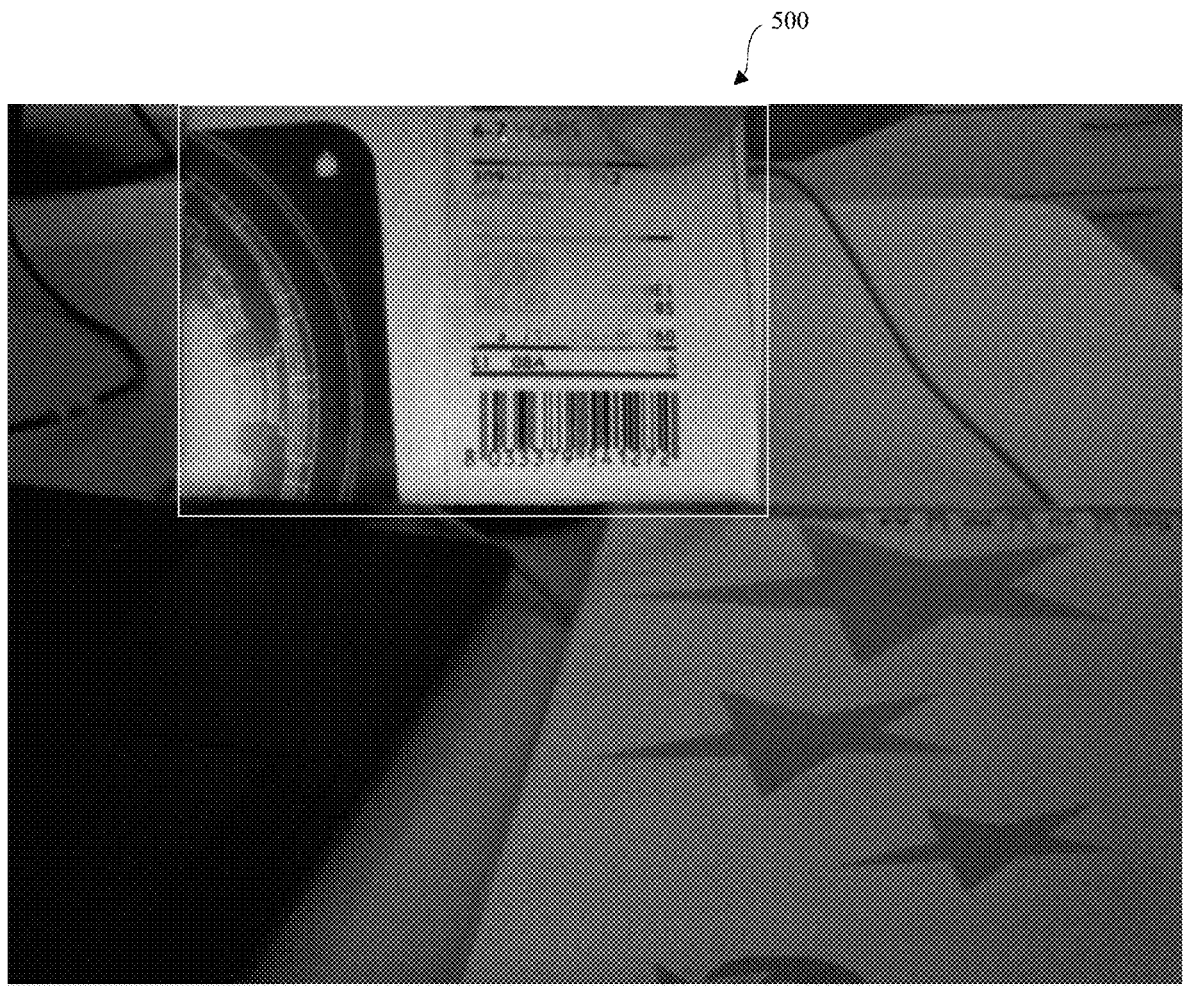
FIG. 5 shows the same object in the far field-of-view away from the scanner.

As an example, FIG. 3 shows an example of an image 300 captured of scanner field-of-view (without objects of interest) of the scanner. FIG. 4 shows an image 400 an object in the field-of-view close to the code reader, while FIG. 5 shows and image 500 with the same object in the far field away from the scanner (note the smaller impacted area in the image). It is noted that the background of the images 300, 400, 500 are not necessarily reflective of a retail environment, and that images captured in a retail environment or other environment where code readers are often employed may have various backgrounds. These images 300, 400, 500, however, demonstrate that an object in the far field may be likely to impact a relatively minor portion of the image, whereas closer objects in the near field may be likely to impact (i.e., consume) a relatively larger portion of the image. Objects in the background are more likely to be unrelated to a desired scanning operation, whereas objects in the foreground are more likely to be related to a desired scanning operation.

The object detection operation of the scanner may include a configurable triggering threshold that may be set, at least in part, based on how many changes need to be detected in order to trigger the object detection (i.e., achieve a positive result for object detection) which may then initiate the scanning phase in presentation mode (e.g., reading, decoding, etc.). As used herein, a "change" is defined as a measurable difference between a captured image and a reference image above a sensitivity threshold. The change may be based on a single unit (e.g., a pixel) or multiple elements (e.g., a tile or grouping of pixels). In the example of a pixel, the change may be based on a pixel value (e.g., grey level) being different in the captured image compared to the corresponding pixel in the reference image. In the example of a tile, the change may be based on a difference between an average pixel value for the tile of the captured image compared to an average pixel value for the corresponding tile in the reference image. These changes may be based on a sensitivity threshold that is based on a range of pixel values (or average pixel values). For example, the sensitivity threshold may be set at a range of pixel values that are ±a tolerance value from the reference image.

The amount of change needed (i.e., triggering threshold) to trigger a positive result may be expressed and selectable by the user as a percentage of the image area. For example, if the triggering threshold is set at 25%, a positive result may be triggered when the measured changes are detected to meet or exceed the triggering threshold (e.g., at least 25% of pixels, 25% of tiles, etc.). As a result, the scanning phase may be initiated. If the measured changes to not meet or exceed the triggering threshold, then there may be an absence of a positive result which may be referred to as a negative result. As a result, the scanning phase may not be initiated.

The object detection operation may be organized in two phases: training and running. In the training phase, the operation of the processor looks for (and learns) the static field-of-view visible by the reader. As a result, a trained reference image may be stored. During the running phase, the operation of the processor receives an image as an input, which is then compared to the trained reference image in order to determine if a consistent change occurred because of a likely is a new object being presented in front of the code reader. If so, the barcode scanning phase is triggered. Thus, the background may be acquired in the training phase (e.g., reference image) and an acquired image may be captured during the running phase for analysis (e.g., object detection).

During the running phase, conventional code readers triggered a detection whenever a minimal change above some sensitivity thresholds in terms of gray levels was detected in any portion of the image. Embodiments of the disclosure add an additional threshold to the code reader during the running phase, which is orthogonal to previously existing thresholds. For example, existing thresholds work on pixel gray levels to determine which is the minimum noise level upon which a change is detected. In embodiments of the disclosure, the additional configurable triggering threshold tells how many changes need to be detected before triggering the scanning phase. In terms of product configuration, the amount of changes is expressed in percentage of the image (e.g., within a range of 0-100%).

In some embodiments, the acquired image may be divided into tiles of pixels having a defined area as will be described below with reference to FIG. 6. For each tile it is checked if the percentage of changes (vs the reference image) is outside a set sensitivity threshold to determine whether a particular tile experiences a sufficient change great enough to be outside the sensitivity threshold. In some embodiments, the sensitivity threshold may be based on an average pixel value for the pixels within the corresponding tiles (±a tolerance to provide a range for the sensitivity threshold). As an example, the captured image may be divided in tiles of fixed size (e.g., 32×32 pixels) and each tile may be compared to corresponding tiles in the reference image according to the sensitivity threshold. A first average pixel value may be determined for the first tile of the captured image, when then may be compared to the average pixel value of the corresponding first tile of the reference image. If the first average pixel value falls within the sensitivity threshold range of the average pixel value of the reference image, then the processor may determine the change to effectively be noise rather than a true change indicative of an object for further analysis. If, however, the first average pixel value falls outside the sensitivity threshold range of the average pixel value of the reference image, then the processor may determine the change to be a true change indicative of an object for further analysis. The tile at issue may then be counted among the other tiles experiencing similar changes to determine whether there are enough such tiles to exceed the triggering threshold.

The configurable triggering threshold the number of tiles of the image needed to be impacted, proportionally. If the number of tiles that exceed the triggering threshold is higher than another specific triggering threshold, the scanning phase may begin a configurable triggering threshold. This approach may achieve efficiency and portability across a plurality of different products.

In some embodiments, the acquired image may be compared on a pixel-by-pixel basis relative to the reference image to determine how many pixels have detected a change relative to the total number of pixels in the image. For example, if the configurable triggering threshold is set at 20% and the object detection operation detects that 35% of the total pixels are determined to have exhibited a change from the sensitivity threshold, the object detection operation may determine that the object detection exceeds the triggering threshold causing the scanning phase to be initiated in response thereto. If, on the other hand, the object detection operation detects that 8% of the total pixels are determined to have exhibited a change from the sensitivity threshold, the object detection operation may determine that the object does not exceed the triggering threshold thereby causing the scanning phase to not be initiated.

Figure 6:
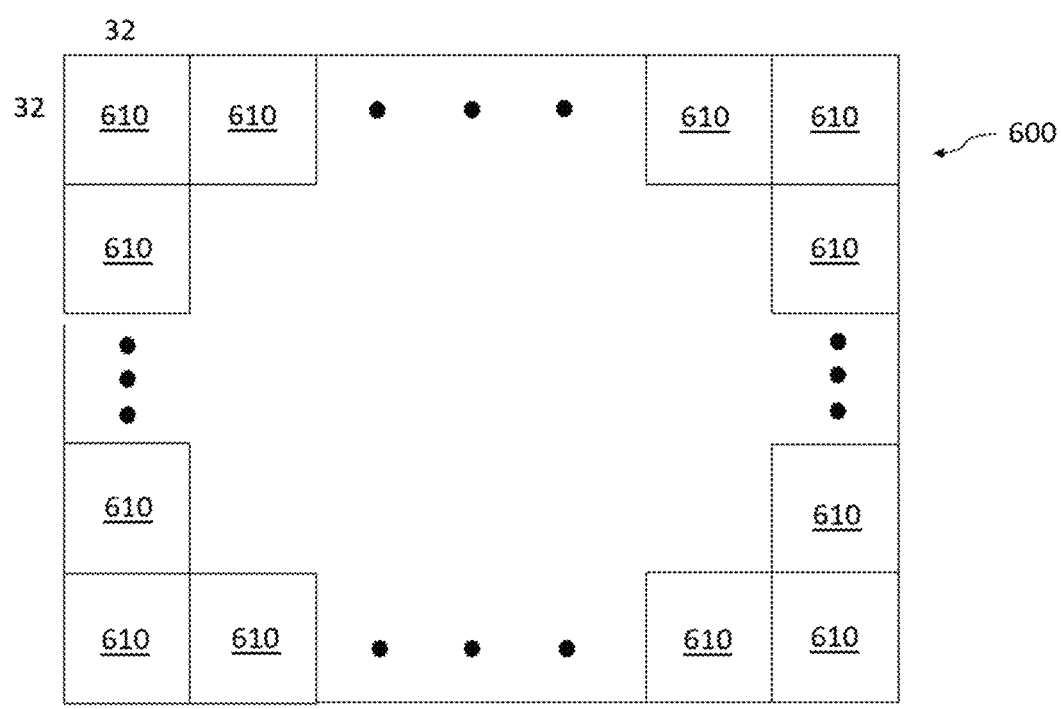
FIG. 6 is a representation of an image that has been divided into tiles according to an embodiment of the disclosure.

FIG. 6 is a representation of an image 600 that has been divided into tiles 610 according to an embodiment of the disclosure. Each tile 610 may have an area (e.g., 32×32 pixels, or some other defined area) that collectively make up the entire image 600. Reference images (acquired during training) and captured images (acquired during operation) may each be divided into tiles 610 such that each tile from a captured image may first be compared to a sensitivity threshold relative to a corresponding tile in the reference image to determine whether a tile has been sufficiently impacted by an object. If enough tiles have been sufficiently impacted based on an overall configurable triggering threshold, then the scanning phase of the code reader may be triggered as described below.

Figure 7:
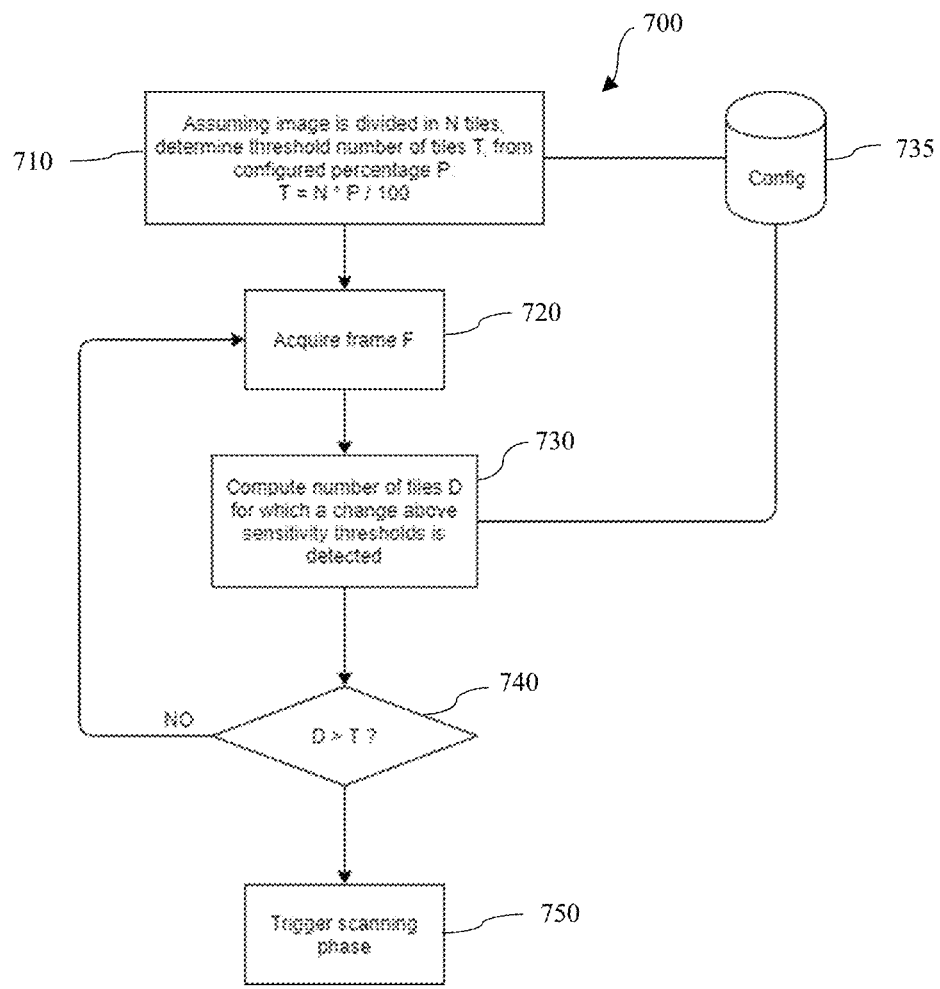
FIG. 7 is a flowchart illustrating a method for detecting an object of a code reader according to an embodiment of the disclosure.

FIG. 7 is a flowchart 700 illustrating a method for detecting an object of a code reader according to an embodiment of the disclosure. Embodiments of the disclosure may trigger the scanning phase based on detection of an object within the scanning field-of-view. This determination may be based, at least in part, on an orthogonal configuration parameter (e.g., configurable triggering threshold area expressed in percentage 0-100%). In some embodiments, the code reader may include a sensitivity threshold is also a user configurable parameter or that may change with the triggering threshold depending on a selection of a configurable setting by the user. For example, the code reader may have a first configurable setting selected by the user which may set a first sensitivity threshold combined with a first triggering threshold. The code reader may also have a second configurable setting selected by the user which sets a second sensitivity threshold combined with a second triggering threshold. In some embodiments, the first triggering threshold and the second triggering threshold may be different. In addition, in some embodiments, the first sensitivity threshold and the second sensitivity threshold may be the same or different for different possibilities of configurable settings as desired by the user or as needed for a particular application.

As an example, the code reader may include three configurable settings that may be selected by a user for object detection: "Low", "Medium", "High" as default configurations. In some embodiments, the user may also create new configurable settings or may re-define the default configurations as desired. Thus, in an exemplary embodiment, the threshold levels may be defined as follows:

a. Low: low sensitivity threshold+triggering threshold (area percentage 10%);
b. Medium: medium sensitivity threshold+triggering threshold (area percentage 0%); and
c. High: high sensitivity threshold+triggering threshold (area percentage 0%).

In this embodiment, the sensitivity thresholds may be different with the low sensitivity threshold being lowest range, the high sensitivity threshold being the highest range, and the medium sensitivity threshold being a middle range that is between the low and the high sensitivity thresholds. As indicated, some triggering thresholds may the same or different depending on the configurable settings. Although three configurable settings are described herein, any number of configurable settings are contemplated. As such, various combinations of sensitivity thresholds and triggering thresholds may be combined for a given configurable setting as desired for a particular use case. In any case, this example is to demonstrate contemplated default values being there for compatibility reasons. The configurable triggering threshold area may be manually overridden for any level in case no predefined value fits the customer needs.

Referring now specifically to FIG. 7, at operation 710 a number of tiles (N) may be defined for dividing the images (e.g., acquired image and background image). From this number of tiles, a threshold number of tiles (T) is determined as the configurable triggering threshold that is utilized to determine if a positive object detection result is achieved. The threshold number of tiles (T) may be based, at least in part, on a desired percentage (P) that is configurable by the user for a particular application (e.g., environment, desired sensitivity, etc.) For example, $T=N*P/100$.

When a new frame is acquired by the imager at operation 720, the processor may compute the number of tiles (D) for which a change is detected above sensitivity thresholds at operation 630. For example, the process may compare each tile of the acquired image to a corresponding tile of the background image. This number of tiles (D) of the acquired image that exhibits such a change above these internal sensitivity thresholds may then be compared to the threshold number of tiles (T) to determine if the scanning phase is triggered. If the number of tiles (D) is exhibiting such a change is greater than the threshold number of tiles (T) at operation 740, the scanning phase may be triggered at operation 750. Otherwise, the processor continues acquiring images at operation 720 for further analysis. At operation 735, the user may change the configurable triggering threshold if desired for different threshold percentages to be used by the processor.

Additional Non-Limiting Embodiments Include:

Embodiment 1: A code reader, comprising: an imager configured to capture an image; and a processor operably coupled to the imager, the processor configured to: perform an object detection operation having both a sensitivity threshold and a configurable triggering threshold indicative of an amount of changes needed to be detected within the image in order to trigger a positive result for object detection; and initiate a scanning phase for the code reader to read and decode an indicia responsive to the positive result being achieved by the object detection operation.

Embodiment 2. The code reader of Embodiment 1, wherein the triggering threshold is based on a percentage of the image area selected by a user.

Embodiment 3. The code reader of Embodiment 2, wherein the object detection operation includes dividing the image into a plurality of tiles based on the selected percentage to determine a number of tiles (D) that are needed to exhibit a change above the sensitivity threshold to be considered triggering the positive result based on the configurable triggering threshold.

Embodiment 4. The code reader of Embodiment 3, wherein the object detection operation compares each tile to a corresponding tile of a reference background image to determine a number of tiles that exceed the sensitivity threshold based on the comparison.

Embodiment 5. The code reader of Embodiment 4, wherein the object detection operation compares the number of tiles that exceeded the sensitivity threshold to the determined number of tiles (D) based on the configurable triggering threshold indicative of a percentage of tiles needed to exceed and trigger the positive result.

Embodiment 6. The code reader of Embodiment 2, wherein the object detection operation: compares each pixel to a corresponding pixel of a reference background image to determine a number of pixels that exceed the sensitivity threshold based on the comparison; and compares the number of pixels that exceeded the sensitivity threshold to the determined number of pixels based on the configurable triggering threshold indicative of the percentage of pixels needed to exceed and trigger the positive result.

Embodiment 7. The code reader of any of Embodiments 1 through 6, wherein the sensitivity threshold is also a user configurable parameter.

Embodiment 8. The code reader of Embodiment 7, wherein: a first configurable setting selected by the user sets a first sensitivity threshold combined with a first triggering threshold; and a second configurable setting selected by the user sets a second sensitivity threshold combined with a second triggering threshold, wherein the first triggering threshold and the second triggering threshold are different.

Embodiment 9. The code reader of Embodiment 8, wherein the first sensitivity threshold and the second sensitivity threshold are the same.

Embodiment 10. The code reader of Embodiment 8, wherein the first sensitivity threshold and the second sensitivity threshold are different.

Embodiment 11. The code reader of any of Embodiments 3 through 10, wherein the background image is captured during a training phase and the image is captured during a running phase.

Embodiment 12. The device of any of Embodiments 1 through 11, wherein the device is a handheld scanner operable in a handheld mode and a presentation mode.

Embodiment 13. The device of any of Embodiment 1 through 11, wherein the device is a presentation scanner.

Embodiment 14. The device of any of Embodiments 1 through 11, wherein the device is a fixed retail scanner or a top-down reader associated with the fixed retail scanner.

Embodiment 15. A method for operating a code reader, the method comprising: capturing an image with an imager; and performing an object detection operation having a configurable triggering threshold that is indicative of an amount of changes needed to be detected within the image in order to trigger a positive result for object detection; and initiating a scanning phase for the code reader to read and decode an indicia responsive to the positive result being achieved by the object detection operation.

Embodiment 16. The method of Embodiment 15, wherein the amount of changes for the triggering threshold is based on a percentage of an image area.

Embodiment 17. The method of Embodiment 16, wherein the percentage of the image area is a default value.

Embodiment 18. The method of Embodiment 16 or Embodiment 17, wherein the percentage of the image area is modified by a user.

Embodiment 19. The method of any of Embodiments 16 through 18, wherein performing the object detection operation includes: dividing the image into a plurality of tiles based on the percentage to determine a number of tiles (D) that are needed to exhibit a change above a sensitivity threshold to be considered triggering the positive result based on the configurable triggering threshold; comparing each tile to a corresponding tile of a reference background image to determine a number of tiles that exceed the sensitivity threshold based on the comparison; and comparing the number of tiles that exceeded the sensitivity threshold to the determined number of tiles (D) needed to exceed the configurable triggering threshold to trigger the positive result.

Embodiment 20. The method of any of Embodiments 16 through 19, further comprising: selecting a first configurable setting including a first sensitivity threshold combined with a first triggering threshold; and selecting a second configurable setting including a second sensitivity threshold combined with a second triggering threshold, wherein the first triggering threshold and the second triggering threshold are different.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A code reader, comprising:
    an imager configured to capture an image; and
    a processor operably coupled to the imager, the processor configured to:
        perform an object detection operation having both a sensitivity threshold and a configurable triggering threshold, the triggering threshold indicative of an amount of changes, as determined by the sensitivity threshold, needed to be detected within the image in comparison to a reference background image in order to trigger a positive result for object detection, wherein the object detection operation:
        divides the image and the reference background image into a plurality of tiles based on the triggering threshold to determine a number of tiles (D);
        compares each tile to a corresponding tile of the reference background image to determine a number of tiles exhibiting a change that exceeds the sensitivity threshold based on the comparison; and
        compares the number of tiles that exceeded the sensitivity threshold to the determined number of tiles needed to exceed the triggering threshold for indicating the positive result; and
        initiate a scanning phase for the code reader to read and decode an indicia responsive to the positive result being achieved by the object detection operation.

2. The code reader of claim 1, wherein the triggering threshold is based on a percentage of the image area selected by a user.

3. The code reader of claim 1, wherein the object detection operation compares the number of tiles that exceeded the sensitivity threshold to the determined number of tiles (D) based on the configurable triggering threshold indicative of a percentage of tiles needed to exceed and trigger the positive result.

4. The code reader of claim 1, wherein the sensitivity threshold is also a user configurable parameter.

5. The code reader of claim 4, wherein:
    a first configurable setting selected by the user sets a first sensitivity threshold combined with a first triggering threshold; and
    a second configurable setting selected by the user sets a second sensitivity threshold combined with a second triggering threshold, wherein the first triggering threshold and the second triggering threshold are different.

6. The code reader of claim 5, wherein the first sensitivity threshold and the second sensitivity threshold are the same.

7. The code reader of claim 5, wherein the first sensitivity threshold and the second sensitivity threshold are different.

8. The code reader of claim 1, wherein the background image is captured during a training phase and the image is captured during a running phase.

9. The device of claim 1, wherein the device is a handheld scanner operable in a handheld mode and a presentation mode.

10. The device of claim 1, wherein the device is a presentation scanner.

11. The device of claim 1, wherein the device is a top-down reader associated with a fixed retail scanner.

12. The code reader of claim 1, wherein the change between tiles is determined based on identifying a difference in an average pixel value within a tile of the image and an average pixel value of the corresponding tile of the reference background image exceeding the sensitivity threshold.

13. A code reader comprising:
    an imager configured to capture an image; and
    a processor operably coupled to the imager, the processor configured to:
        perform an object detection operation having both a sensitivity threshold and a configurable triggering threshold, wherein the triggering threshold is indicative of an amount of changes, as determined by the sensitivity threshold, needed to be detected within the image in comparison to a reference background image in order to trigger a positive result for object detection, wherein the object detection operation:
        compares each pixel to a corresponding pixel of a reference background image to determine a number of pixels that exceed the sensitivity threshold based on the comparison; and
        compares the number of pixels that exceeded the sensitivity threshold to the determined number of pixels based on the configurable triggering threshold indicative of a percentage of pixels needed to exceed and trigger the positive result; and
        initiate a scanning phase for the code reader to read and decode an indicia responsive to the positive result being achieved by the object detection operation.

14. A method for operating a code reader, the method comprising:
    capturing an image with an imager; and
    performing an object detection operation having a configurable triggering threshold that is indicative of an amount of changes, as determined by a sensitivity threshold, needed to be detected within the image in comparison to a reference background image in order to trigger a positive result for object detection, the object detection operation further including:

comparing a defined region of the image to a corresponding defined region of the reference background image to determine whether a change occurred above the sensitivity threshold based on the comparison; and comparing the determined number of changes against the configurable triggering threshold to determine whether there is a positive result; and initiating a scanning phase for the code reader to read and decode an indicia responsive to the positive result being achieved by the object detection operation.

15. The method of claim 14, wherein the amount of changes for the triggering threshold is based on a percentage of an image area.

16. The method of claim 15, wherein the percentage of the image area is a default value.

17. The method of claim 15, wherein the percentage of the image area is modified by a user.

18. The method of claim 15, wherein performing the object detection operation includes:

dividing the image and the reference background image into a plurality of tiles based on the percentage to determine a number of tiles (D) that are needed to exhibit a change above the sensitivity threshold to be considered triggering the positive result based on the configurable triggering threshold;

comparing each tile of the image to a corresponding tile of the reference background image to determine a number of tiles that exceed the sensitivity threshold based on the comparison; and comparing the number of tiles that exceeded the sensitivity threshold to the determined number of tiles (D) needed to exceed the configurable triggering threshold to trigger the positive result.

19. The method of claim 15, further comprising:

selecting a first configurable setting including a first sensitivity threshold combined with a first triggering threshold; and selecting a second configurable setting including a second sensitivity threshold combined with a second triggering threshold, wherein the first triggering threshold and the second triggering threshold are different.

20. The method of claim 14, wherein each of the defined region of the image and the corresponding defined region include one of a single pixel or a defined grouping of pixels.

* * * * *